(12) United States Patent
Yigit et al.

(10) Patent No.: US 10,834,004 B2
(45) Date of Patent: Nov. 10, 2020

(54) PATH DETERMINATION METHOD AND SYSTEM FOR DELAY-OPTIMIZED SERVICE FUNCTION CHAINING

(71) Applicant: NETSIA, INC., Sunnyvale, CA (US)

(72) Inventors: Beytullah Yigit, Istanbul (TR); Burak Gorkemli, Istanbul (TR); Seyhan Civanlar, Istanbul (TR)

(73) Assignee: NETSIA, INC., Santa Clara, CA (US)

( * ) Notice: Subject to any disclaimer, the term of this patent is extended or adjusted under 35 U.S.C. 154(b) by 18 days.

(21) Appl. No.: 16/140,524

(22) Filed: Sep. 24, 2018

(65) Prior Publication Data

US 2020/0099625 A1  Mar. 26, 2020

(51) Int. Cl.
| | |
|---|---|
| *H04L 12/851* | (2013.01) |
| *H04L 12/715* | (2013.01) |
| *H04W 56/00* | (2009.01) |
| *H04L 12/803* | (2013.01) |
| *H04L 12/841* | (2013.01) |
| *H04L 12/727* | (2013.01) |
| *H04L 12/24* | (2006.01) |
| *H04L 12/707* | (2013.01) |
| *H04L 12/26* | (2006.01) |

(52) U.S. Cl.
CPC .......... *H04L 47/283* (2013.01); *H04L 41/145* (2013.01); *H04L 43/0805* (2013.01); *H04L 43/0852* (2013.01); *H04L 45/121* (2013.01); *H04L 45/22* (2013.01); *H04L 45/64* (2013.01); *H04L 47/24* (2013.01)

(58) Field of Classification Search
CPC ....... G06F 2009/45595; H04L 41/5054; H04L 67/16; H04L 41/5045; H04W 28/10
USPC .................................................. 370/399, 409
See application file for complete search history.

(56) References Cited

U.S. PATENT DOCUMENTS

| | | | |
|---|---|---|---|
| 2016/0380807 A1* | 12/2016 | Shevenell | H04L 41/0816 370/252 |
| 2017/0064039 A1* | 3/2017 | Shen | H04L 41/0806 |
| 2017/0104847 A1* | 4/2017 | Zhang | H04L 67/327 |
| 2017/0279668 A1* | 9/2017 | Shevenell | H04L 41/0677 |
| 2018/0004562 A1* | 1/2018 | Huntley | G06F 12/10 |
| 2018/0077033 A1* | 3/2018 | Tofighbakhsh | H04M 15/41 |

(Continued)

OTHER PUBLICATIONS

"OpenFlow Switch Specification,"Open Networking Foundation, V 1.5.1, Mar. 26, 2015, 283pgs.

(Continued)

*Primary Examiner* — Asad M Nawaz
*Assistant Examiner* — Jason A Harley
(74) *Attorney, Agent, or Firm* — IP Authority, LLC; Ramraj Soundararajan

(57) ABSTRACT

A method as implemented in a controller in a SDN: (a) receiving service function chain orders of packet flows comprising a service function chain; (b) receiving, in real-time, delay measurements from either one of the virtual network functions and/or one of the network switches; (c) determining a plurality of realizations of the service function chain orders of (a) in order to minimize a total delay; (d) choosing an optimal realization corresponding to a least delay; and (e) determining one or more flow rules for the one or more network switches, the determining based on the optimal realization in (d). A controller and an article of manufacture implementing such a method are also described.

18 Claims, 6 Drawing Sheets

(56) References Cited

U.S. PATENT DOCUMENTS

2018/0183851 A1* 6/2018 Fiedler ................. H04L 65/605
2018/0262431 A1* 9/2018 Zhang .................. H04L 47/125
2018/0295036 A1* 10/2018 Krishnamurthy ... H04L 41/0893

OTHER PUBLICATIONS

"P4 16 Language Specification," The P4 Language Consortium, V 1.0.0, May 22, 2017, 129pgs.
"Network Functions Virtualisation (NFV); Terminology for Main Concepts in NFV," ETSI GS NFV 003, V 1.2.1, Dec. 2014, 13pgs.
"In-band Network Telemetry (INT) Dataplane Specification," working draft, P4.org Applications Working Group, Aug. 17, 2018; 42pgs.
Quinn et al., "Network Service Header (NSH)," Internet Engineering Task Force (IETF), RFC 8300, Jan. 2018, 41pgs.

* cited by examiner

| | |
|---|---|
| S1: P1 P3 | D1= d(r2)+d(V3@P4)+(V4@P4)+(Vu1@P4)+(Vu2@P4) |
| S2: P1 P2 P4 [V3, V4, Vu1, Vu2] | D2= d(r1)+d(V3@P4)+(V4@P4)+(Vu1@P4)+(Vu2@P4) |
| S3: P1 P3 [V3] P4 [V4, Vu1, Vu2] | D3= d(r2)+d(V3@P3)+(V4@P4)+(Vu1@P4)+(Vu2@P4) |
| S4: P1 P3 [V3, Vu1] P4 [V4, Vu2] | D4= d(r2)+d(V3@P3)+(V4@P3)+(Vu1@P3)+(Vu2@P4) |
| S5: P1 P2 [Vu1] P4 [V3, V4, Vu2] | D5= d(r1)+d(V3@P4)+(V4@P4)+(Vu1@P3)+(Vu2@P4) |
| S6: P1 P2 [Vu1, Vu2] P4 [V3, V4] | D6= d(r1)+d(V3@P4)+(V4@P4)+(Vu1@P3)+(Vu2@P3) |

FIG. 4

PATH DETERMINATION METHOD AND SYSTEM FOR DELAY-OPTIMIZED SERVICE FUNCTION CHAINING

BACKGROUND OF THE INVENTION

Field of Invention

The present invention relates to a system and a method for delay-optimized routing of flows with service function chaining (SFC) in a Software Defined Network (SDN).

Discussion of Related Art

Any discussion of the prior art throughout the specification should in no way be considered as an admission that such prior art is widely known or forms part of common general knowledge in the field.

Network Function Virtualization (NFV) decouples network functions from the underlying hardware so that they run as software images on commercial off-the-shelf hardware. It does so by using standard platforms (networking, computation, and storage) to virtualize the network functions. The objective is to reduce the dependence on dedicated, specialized and expensive physical devices by allocating and using the physical and virtual resources only when and where they're needed. With this approach, service providers can reduce overall costs by (a) shifting more components to a common physical infrastructure, (b) responding more dynamically to changing market demands by deploying new applications and services as needed, and (c) accelerating time to market for new services by streamlining service delivery.

NFV uses all possible physical hardware resources as hosts (e.g., switches, routers, servers, etc.) for so-called Virtual Machines (VM) on which a variety of network-based services can be activated and deactivated on an as needed basis. A VM acts just like a physical server. There can be several VMs on a host, each VM hosting a VNF. If the traffic is forwarded from one VNF to another on the same host, a virtual switch (vSwitch) on that host performs the switching, meaning the traffic does not have to leave the host until all these services are delivered. A vSwitch basically acts like a network switch with virtual NICs (vNICs) switching packets across these vNICs from one attached VM to another on the same host. The host on which the vSwitch is deployed has at least one physical NIC to which some of these vNICs map for the traffic entering and exiting the host. The physical NIC connects to another physical host/hardware platform.

A key software component called 'orchestrator', which provides management of the virtual functions is responsible for activating new functions, service function lifecycle management, global resource management, and validation and authorization of NFV resource requests. ETSI provides a comprehensive set of standards defining NFV Management and Orchestration (MANO) interface in various documents. There are several interfaces that tie NFV to the Operations Systems (OSS) and Business Systems (BSS) systems. All these interfaces and their functions are publicly available in ETSI NFV Reference Architecture documents.

NFV already found itself applications in (a) enterprise customer premises equipment (CPE), (b) 5G mobile network's new architecture, (c) data centers, and (d) residential home networking. Particularly, the new 5G network architecture shifts completely from 'network of entities' to 'network of functions' wherein well-known core network entities such as SGW, PGW, MME and HSS are now simple virtual functions widely distributed across the core network. Furthermore, these virtual functions are subdivided into the Control Plane (CP) and user Plane (UP) functions leveraging the SDN architecture's control and data plane separation. User Plane Function (UPF), Access and Mobility Management Function (AMF), and Policy Control Function (PCF) are just a few examples of those newly defined virtual functions. Description and details of these functions can be found in 3GPP's 5G Architecture documents.

Deep Packet Inspection (DPI), Load Balancing, Network Address Translation (NAT), Firewall (FW), QoS, email, web services, and Intrusion Prevention System (IPS) and virtual Setup Box (vSTB) are just a few VNFs to name that are already deployed on hardware/server infrastructure where it may be more appropriate for a service provider to deliver virtualized network functions as part of a service offering. The general principles of such virtualization are to increase the flexibility and economy by sharing resources across many enterprises, and thereby to decrease setup and management time and cost. As an alternative model, the service provider can make an available suite of infrastructure and applications as a 'platform' on which the enterprise can themselves deploy and configure their network applications completely customized to their business needs.

A programmable network such as a Software Defined Network (SDN) provides yet another new physical network infrastructure in which the control and data layers are separated. The data layer, which is controlled by a centralized controller, is comprised of so-called 'switches' (also known as 'forwarders') that act as L2/L3 switches receiving instructions from a centralized 'controller' (infrastructure) using a standard protocol also known as OpenFlow (OpenFlow Switch Specification Version 1.5.1, 2014). SDN architecture has several benefits leveraging the centralized control such as global network visibility when it comes to route determination, network-wide routing consistency, easy support for QoS services, network slicing and network virtualization.

A key attribute of SDN is the decoupling of route determination and packet forwarding through separation of control and data planes. The route determination function is performed within the controller. The calculated routes are mapped into so called 'flow rules/tables', within the controller, which form the set of instructions prepared for each individual network switch precisely defining where and how to forward the packets of each packet flow passing through that switch. The 'where' part defines to which outgoing port of switch the packet must be sent, whereas the 'how' part defines what changes must be performed to each packet matching a criteria in the flow table (changes in the header fields, for example). The controller sends the flow rules to each network switch and updates them as the network map changes. Route determination is attributed to the control plane, i.e., the controller, whereas packet forwarding is attributed to the data plane, i.e., the switches.

OpenFlow protocol assumes that the network switch has a fixed-function (non-programmable) switch ASIC. Over time, OpenFlow evolved from supporting only four protocols to a far larger set of protocols, and from supporting a few header fields to processing over 50 different header fields. As switch ASIC vendors announce which new header fields and protocols they can now support, OpenFlow evolves accordingly. This is the main reason of many versions of OpenFlow issued over time. But, the paradigm is rapidly turning upside down with the new programmable ASICs. Programming Protocol Independent Packet Processor, P4 (see 'P4 language specification' v1.0.0, The P4

Language Consortium, 2017, P4.org) switches are those new types of SDN switches that are directly programmable because they have programmable ASIC chips in their core. These ASICs are programmable by using a common programming language called P4. Basically, rather than have the switch tell us the limited set of capabilities it supports, with P4 we tell the switch what it should be doing. P4 lets us define what headers a switch will recognize (or "parse"), how to match on each header, and what actions we would like the switch to perform on each header. P4 unambiguously specifies the precise way in which headers are matched, and the actions to be performed on them. In fact, one can compile a P4 program to directly generate an executable switch.

Service Function Chaining (SFC) is a service that uses a plurality of virtual network functions traversed in a specified order along the route of a packet flow. When a SFC is implemented on an SDN, the route of the packet flow receiving a SFC traverses those functions listed within an SFC as well as the SDN switches (and vSwitches) along the data path. Thus, packet routing has to couple the packet flow's path determination within the SDN (i.e., the sequence of physical and virtual switches along the data path of the flow) with the exact virtual network function location determination (i.e., the sequence of service function instances along the data path of the flow) providing the service chain. The final route comprises a list of switches and a list of virtual machines (servers). A 'VNF Forwarding Graph' is a prior-art concept, (see ETSI GSN FV 003, 'Network Functions Virtualization (NFV); Terminology for Main Concepts in NFV') meaning the sequence of virtual network functions that packets traverse for service chaining. It essentially provides the logical connectivity across the network between virtual network functions. That logical connectivity has to map to physical connectivity within the controller.

In summary, an abstract network service based on a chain of VNFs must include identification and sequencing of different types of VNFs involved, and the physical relationship between those VNFs and the interconnection (forwarding) topology with those physical network functions such as switches, vSwitches and transmission facilities to provide the service. Some packet flows may need to visit specific destination(s) (e.g., a set of VNFs) before reaching its final destination, while other flows may only have a final Internet destination without traversing any VNFs (normal—non-SFC flows). Yet for other packet flows, the final Internet destination is a virtual network function (such as a video streaming or web service).

It is found in studies that the packet transfer from the network switch to a Virtual Machine (VM) hosting the service function represents a significant performance overhead. This is especially troublesome with simple VNFs where the actual processing time can be comparable with this overhead. While the overhead is very small for Linux containers as Virtual Machines, for a granular service chaining architecture—with a lot of small VNFs—the network stack of the Linux kernel itself can cause bottlenecks. The overhead of virtualization has not been addressed in prior art. Particularly when there are strict delay requirements for low-latency operations, a novel approach is needed to streamline the operations within a service chain. In addition to delay overhead, some virtual function instances may be overloaded with packet processing and therefore extremely slow to respond. Each virtual function type may be distributed, i.e., may have many physical instance/realizations within an SDN. Thus, any path selection within an SDN to satisfy the needs of a service chain must take into account not only the availability of specific virtual functions on a chosen data path, but also the delay incurring due to selected instances of the virtual function. It is worthwhile to note that the aforementioned delay can be simply due to the characteristics (the specific operation) of the virtual function, and therefore static, or maybe time-varying due to the current processing load.

With the advent of programmable switches such as P4, much more sophisticated flow rules than those that can be programmed with OpenFlow become feasible. For example, P4 switches can be programmed to measure various delay components during the processing of packet flows and to report these delays to the controller in real-time. It can measure the packet delay within a particular buffer, across a switch (i.e., between any two ports of a switch, across multiple switches, or of a virtual function associated with the P4 switch (either the function is on-board, or on a server directly attached to one of the switch port). The P4 switch forwards each packet to a VNF according to a flow rule. Thus, it can measure the time it takes to complete the process.

From the SDN perspective, a vSwitch or a network switch is functionally the same, i.e., both act as packet forwarders on the data plane and controlled by a centralized controller. Thus, we will treat a vSwitch as another type of switch, and therefore will not distinguish it from network switches.

There are several mechanisms to measure delay using P4 switches. Two exemplary methods are:

(a) The controller instructs the P4 switch to randomly select flows that traverse a particular VNF, and register, in one register, the time the flow exits the switch to enter that VNF, and also register, in another register, the time it returns back to the switch from the VNF. The difference between these two register values is the processing delay of that VNF. The P4 switch can be programmed to perform register updates with a particular periodicity for each attached/neighbor/on-board VNF. Using a similar procedure switching delay (across port pairs) can be measured by selecting random flows' entry and exit times of those certain port pairs of the switch. Prior art mechanisms are readily available for the Controller to read registers within the switch using network management protocols or P4 protocol.

(b) In-band Network Telemetry ("INT") is a framework (see INT Specification document at P4.org web site) designed particularly for an SDN to allow the collection and reporting of the network state, directly from the data plane. P4 switches simply augment the packet header that matches a criterion specified by the controller (i.e., an SFC flow), by the action of inserting specific telemetry data into the packet header. Packets contain header fields that are interpreted as "telemetry instructions" by the switches. The INT starts at an 'INT Source', which is the entity that creates and inserts the first INT Headers into the packets it sends. INT terminates at an 'INT Sink', which is the entity that extracts the INT Headers, and collects the path state contained in the INT Headers. The INT header contains two key information (a) INT Instruction—which is the embedded instruction as to which metadata to collect and (b) INT Metadata—which the telemetry data INT source or any transit switch up to the INT sink inserts into the INT header. The switch that is the INT source of the packet flow receives a match-action criteria to insert an INT header into each packet's header in the form of an INT instruction plus INT metadata, all transit switches along the flow path simply inspect the INT instruction in the header and insert their INT metadata, and the switch (or a host) that is the INT sink removes the INT header and sends all the INT metadata to a monitoring application. The drawback of this method is the big packet overhead for monitoring.

The availability of such delay measurements makes the routing algorithm within the controller much more intelligent particularly because of incorporating the delay sensitivity of the service function chaining. The present invention relates generally to a system and data communications method in a Software Defined Network (SDN), wherein a plurality of Virtual Network Functions is provided within a so called service function chain (SFC) (also referred as service-chain). The embodiments specifically relate to a software application of the SDN controller that enables highly efficient routing that optimizes network delay of a packet flow that has a service-chain. First, the controller receives information about exact locations and types of each VNF instance from MANO or related OS SB SS, and in real-time the processing workload, the packet processing delay and availability of each VNF instance from the P4 switches on the data path. Each switch is programmed to gather delay information and report to the controller using a new function of the controller. The VNF-related information, such as delay and availability, is stored in special VNF databases within the controller. According to an embodiment of this invention, the so called 'SFC realization' is a complete route that contains not only the switches but also the specific physical VNF instances that a packet flow will traverse in the data network to fulfill an SFC order. There may be many SFC realizations corresponding to an SFC, each realization with a different end-to-end delay. The total network delay includes switching delay as well as transmission delay in the network, all of which are measured and reported to the controller. The SFC brings an extra component of delay over and above the network delay, which is significant and therefore must be minimized with proper route selection.

One embodiment, this invention teaches is how to select an optimal SFC realization with the least delay considering all delay components (switching, transmission, VNF packet processing, and VM).

Furthermore, according to an aspect of this invention, each VNF is classified as either 'ordered' or 'unordered' service function, wherein an ordered service function must always be traversed at a specific sequence/order as opposed to an unordered service function that can be provided in any random sequence/order within the chain. That clever separation provides another level of freedom in choosing specific order of function instances and therefore a better control of delay. For example, an instance of an unordered service function that has the lowest delay can be chosen and delivered at any position in the chain. However, not all SFCs have unordered service function components.

When the new controller of this invention receives a service chaining order of a specific user's data flow (SFC order), it first dissects the chain into its ordered and unordered service components, and then re-assembles the service chain in a specific optimal execution order based on the VNF database information collected from the switches (such as minimizing the processing delay occurring in each virtual function instant). The system then instructs the programmable switches on the data path, by sending flow rules to execute the service functions in that optimized special order to optimize delay.

Embodiments of the present invention are an improvement over prior art systems and methods.

SUMMARY OF THE INVENTION

In one embodiment, the present invention provides a controller in a software defined network (SDN) comprising a plurality of network switches interconnected with a plurality of transmission facilities, either the network switches or hardware platforms attached to the switches hosting a plurality of virtual network functions, the controller comprising a processor and storage storing computer readable program code, which when executed by the processor implements: (a) a first application to receive one or more service function chain orders of packet flows, at least one of the orders comprising a service function chain; (b) a second application to receive, in real-time, delay measurements from any of, or a combination of, the following: one of the virtual network functions and one of the network switches; (c) a third application to determine a plurality of realizations of the service function chain orders of (a) in order to minimize a total delay, where the total delay comprises one or more delays incurred due to a chain of one or more virtual network functions in the plurality of virtual network functions and due to one or more network switches in the plurality of network switches, the third application choosing an optimal realization within the plurality of realizations corresponding to a least delay; and (d) a fourth application to receive the optimal realization in (c) and to determine one or more flow rules for the one or more network switches in the plurality of network switches.

In another embodiment, the present invention provides a method as implemented in a controller in a software defined network (SDN) comprising a plurality of network switches interconnected with a plurality of transmission facilities, either the network switches or hardware platforms attached to the switches hosting a plurality of virtual network functions, the method comprising: (a) receiving one or more service function chain orders of packet flows, at least one of the orders comprising a service function chain; (b) receiving, in real-time, delay measurements from any of, or a combination of, the following: one of the virtual network functions and one of the network switches; (c) determining a plurality of realizations of the service function chain orders of (a) in order to minimize a total delay, where the total delay comprises one or more delays incurred due to a chain of one or more virtual network functions in the plurality of virtual network functions and due to one or more network switches in the plurality of network switches; (d) choosing an optimal realization within the plurality of realizations corresponding to a least delay; and (e) determining one or more flow rules for the one or more network switches in the plurality of network switches, the determining based on the optimal realization in (d).

In yet another embodiment, the present invention provides an article of manufacture comprising non-transitory computer storage medium storing computer readable program code which, when executed by a processor implements a method as implemented in a method as implemented in a controller in a software defined network (SDN) comprising a plurality of network switches interconnected with a plurality of transmission facilities, either the network switches or hardware platforms attached to the switches hosting a plurality of virtual network functions, the computer storage medium comprising: (a) computer readable program code receiving one or more service function chain orders of packet flows, at least one of the orders comprising a service function chain; (b) computer readable program code receiving, in real-time, delay measurements from any of, or a combination of, the following: one of the virtual network functions and one of the network switches; (c) computer readable program code determining a plurality of realizations of the service function chain orders of (a) in order to minimize a total delay, where the total delay comprises one or more delays incurred due to a chain of one or more virtual network functions in the plurality of virtual network functions and due to one or more network switches in the plurality of network switches; (d) computer readable program code choosing an optimal realization within the plurality of realizations corresponding to a least delay; and (e) computer readable program code determining one or more flow rules for the one or more network switches in the plurality of network switches, the determining based on the optimal realization in (d).

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 4 illustrates the list of SFC realizations for an SFC.

DESCRIPTION OF THE PREFERRED EMBODIMENTS

Figure 1:
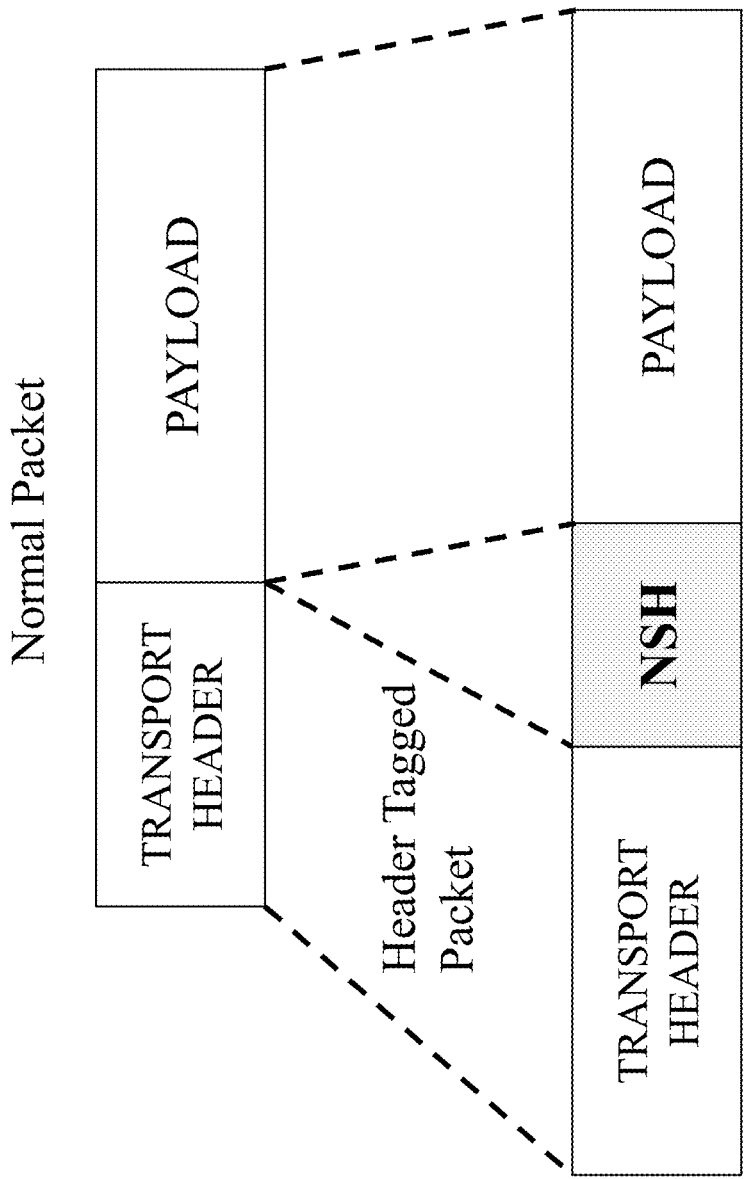
FIG. 1 illustrates the NSH tagging method (prior art).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a router, switch, orchestrator, hardware platform, controller etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a switch, router, controller, orchestrator or virtual machine is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, bridging, VLAN (virtual LAN) switching, layer-2 switching, Quality of Service, and/or subscriber management), and/or provide support for traffic coming from multiple application services (e.g., data, voice, and video).

Any physical device in the network is generally identified by its type, ID/name, Medium Access Control (MAC) address, and Internet Protocol (IP) address. A virtual function runs on a physical platform that can be the switch or a server attached to the switch. There may be several instances of the same virtual function or different types of virtual functions on the same physical platform. The controller of the SDN can run on a single server or may be distributed on several servers. At any point in time, one controller may be the master while others are slaves. Alternatively, the plurality of controllers may be in a peer mode. The controller is attached to each switch in the network.

Note that while the illustrated examples in the specification discuss mainly NFV (as ETSI defines) relying on SDN (as Internet Engineering Task Force [IETF] and Open Networking Forum [ONF] define), embodiments of the invention may also be applicable in other kinds of distributed virtualized network function architectures and programmable network architectures, not necessarily tied to NFV and SDN.

In a possible embodiment, the special order of the service chain is engraved by the ingress switch (also known as the traffic classifier) into each user packet as a collection of data fields as illustrated in FIG. 1, which each switch can look up and then forward the traffic to each proper service function in the order prescribed. This specific tag caters both SDN and non-SDN type networks, and is described in IETF's RFC 8300 as the Network Service Header (NSH). The NSH is transport layer encapsulation independent, meaning it can be transported by a variety of encapsulation protocols. This transport encapsulation may form an overlay network; and if an existing overlay topology provides the required service path connectivity, that existing overlay may be used. An NSH is imposed on the original packet/frame. This NSH contains complete service path information and, optionally, some metadata that are added to a packet or frame and used to create a service plane. Subsequently, an outer transport, network and data link layer (aka L4, L3 and L2 layer) encapsulations are imposed on the NSH, which is used for network forwarding.

A traffic classifier adds the NSH to the data packet. The last router/switch in the chain removes the NSH. Alternatively, the final service function that consumes the packet removes it. The NSH is composed of a 4-byte Base Header, a 4-byte Service Path Header, and optional Context Headers (see IETF RFC 8300). A disadvantage of using NSH header is the growing size of the packet, which may require packet fragmentation and reassembly, and the resultant packet/traffic overhead.

Figure 2:
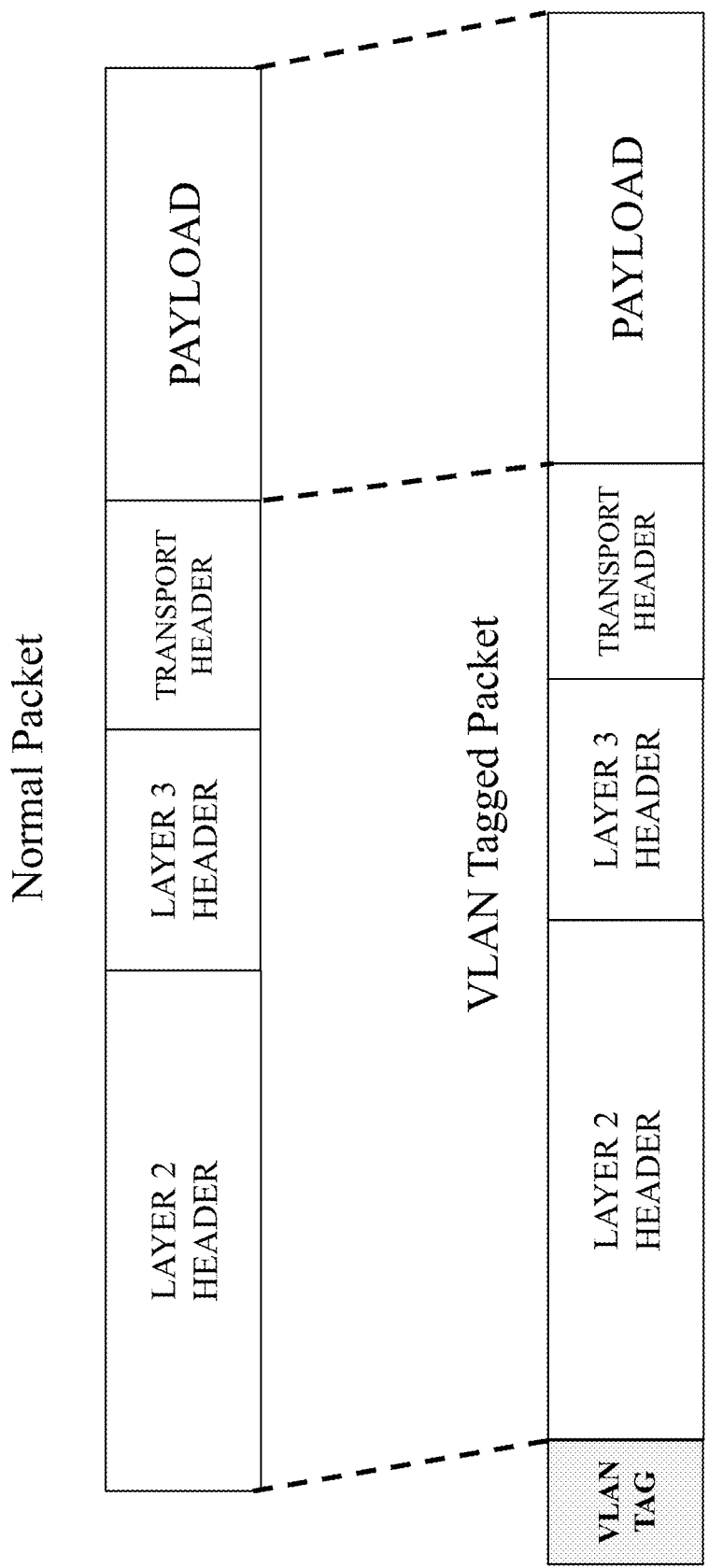
FIG. 2 illustrates the VLAN tagging method (prior art).

In another embodiment, applicable only to SDN type programmable networks, the SFC order is not engraved, but a simple tag (such as the 4-byte VLAN tag per IEEE 802.1Q) is inserted by the traffic classifier into each packet into the Ethernet (L2) packet header to identify the specific flow requesting the service chaining, as illustrated in FIG. 2. In conjunction with the assignment of a VLAN tag to that SFC flow, the SDN controller sends flow rules to each switch so that the switch looks up the tag and determines the next hop for forwarding that flow's packets towards the next virtual network function of the service chain, or towards the next hop switch. This process will enable the forwarding of the traffic to each proper service function in the order prescribed by the controller.

Figure 3:
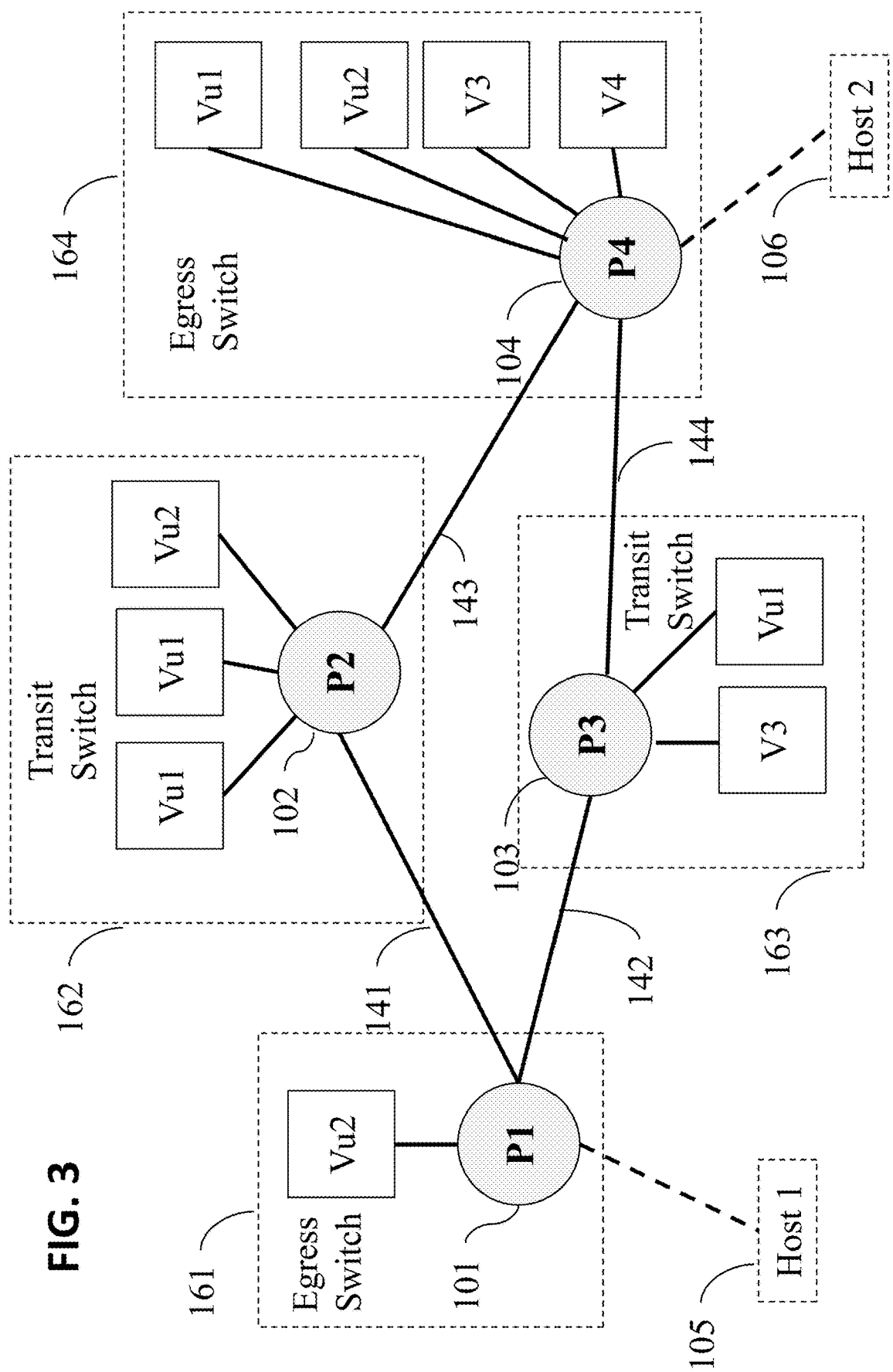
FIG. 3 illustrates a network with ordered and unordered VNFs (prior art).

FIG. 3 illustrates a simple exemplary SDN network with four switches, P1 (101), P2 (102), P3 (103) and P4 (104). Although these switches are assumed to be P4 switches, they can be another type of switch that are programmable by the controller, and can perform delay measurements and reporting. Switches P1 and P2 are interconnected with transmission facility 141, P1 and P3 are connected with transmission facility 142, P2 and P4 are connected with transmission facility 143, and P3 and P4 are connected with transmission facility 144, forming the network topology. The virtual functions are distributed to these four switching nodes. There are four types of virtual functions: V1, V2, V3 and V4. Here, V1 and V2 are classified as 'unordered', and thus labeled as Vu1, and Vu2, while V3 and V4 are 'ordered, meaning V4 must be always be delivered after V3. For example, if V4 is a 'video streaming' service, V3 is a 'parental control' service that blocks certain web sites. There are instances of Vu1 at switching node locations 162, 163 and 164, Vu2 at switching node locations 161, 162 and 164, and V3 at switching node locations 163 and 164, and V4 at switching node location 164 only.

In an exemplary embodiment, each aforementioned virtual function is hosted on a separate physical host attached to a switch port as illustrated in FIG. 3. Many other feasible embodiments provide the same VNF distribution of FIG. 3. For example, in a second exemplary embodiment, Vu1, Vu2, V3 and V4 at switching node 164 are all deployed on the same physical host, each encapsulated in a Virtual Machine (VM), with a vSwitch on the same host switching across these functions, when needed. In a third exemplary embodiment, Vu1 and Vu2 at egress switching node 164 are deployed on a first host attached to P4 switch 104, with a first vSwitch on that first host switching between Vu1 and Vu2. In this embodiment, V3 and V4 at switching node 164 are deployed on a second host, also attached to P4 switch 104, with a second vSwitch deployed on that second host switching between V3 and V4, first and second vSwitches directly attaching to P4 switch via their respective physical host's NICs. Various such implementations can be enumerated for the VNFs at switch locations 162 and 163.

In this simple example scenario, an SFC flow is defined between host 1 (105) and host 2 (106). This flow contains services {V1, V2, V3 and V4}, in that order. Ingress switch location 161 will perform the traffic classification (i.e., where the VLAN or NSH tag is inserted), switching nodes 162 and 163 are two alternative transit locations and switching node 164 is the egress switch node where the VLAN tag or NSH is removed.

There are only two feasible data routes for the traffic: r1={P1→P2→P4} and r2={P1→P3→P4}. There are no other data routes between host 1 and host 2 regardless of the functions in the service-chain. Various types of virtual functions are distributed on r1 and r2 as illustrated in FIG. 3. Several SFC realizations ($S_1$ to $S_6$) are listed in FIG. 4. These SFC realizations take into account the fact that Vu1 and Vu2 are unordered, meaning they can be delivered anywhere in the chain, while V3 and V4 are ordered, meaning V4 must always be delivered after V3. Note that these SFC realizations are either on r1 or r2, depending on where the functional components have instances. Second column in FIG. 4 shows the total packet delay, $d_i$, corresponding to each alternative SFC realization, $S_i$, which is the sum of delays of all chosen service function instances and the data network delay, which is d(r1) and d(r2), respectively depending on which data route is in the SFC Realization, $S_i$. Of course, the aforementioned delay is time-variant. Therefore, it has to be calculated (or updated) right at the start of the packet flow.

The delay-optimized route determination is an NP-hard problem that can't be solved in a deterministic time. The solution can be found by a simple exhaustive search wherein all switching node and VNF alternatives are one by one evaluated. However, this method is highly time consuming particularly for large-scale networks.

In a first algorithmic embodiment, the delay optimized route selection is performed by solving a variation of the classical 'travelling salesman problem (TSP)' well known in prior art by modeling both the switches and VNFs as nodes of the TSP graph, wherein overall route delay (comprised of switching, transmission and VNF delays) is the objective function. Again, this solution is NP-complete.

In the second algorithmic embodiment, the delay-optimized route selection is simplified by decoupling the problem into two separate but less complex problems using the following steps:

(a) First, determining a set of feasible physical data plane routes between source and destination (e.g., r1 and r2)—without any consideration of the VNFs in the service-chain, and possible reduce the set of feasible routes according to their network delay;

(b) Second, mapping VNFs along each chosen feasible route of step (a) to satisfy the service-chain and the delay requirements. Those routes determined in step (a) that do not meet the service-chain are eliminated from the solution set; and (c) Third, adding more feasible physical data plane routes (if there are any) to the set of routes determined in step (a) if step (b) returns no feasible solutions.

If there are no solutions, the service-chain is deemed 'infeasible'. If there are multiple solutions, pick the SFC Realization with the lowest delay.

In a third algorithmic embodiment, the delay-optimized route selection is performed by decoupling into the two simpler problems, using the following steps:

(a) First, determining a set of feasible lowest delay service-chain realizations using the VNFs as the nodes of the graph without factoring into the feasible physical data plane routes;

(b) Second, mapping feasible solutions of (a) to physical data plane routes. In this embodiment, a feasible service-chain realization can be implemented using multiple data plane different routes (for example, if the feasible service-chain is realized using the functions of switching node 164, both r1 or r2 can be selected, as both routes traverse node 164); and (c) Third, adding more feasible solutions (if there are any) to the set determined in step (a) if step (b) returns no feasible solutions.

If there are no solutions, the service-chain is deemed 'infeasible'. If there are multiple solutions, we pick the SFC Realization with the lowest delay.

If there is a service-chain that has an associated high priority, and there are no feasible solutions to meet its requirements, then the controller may decide to (a) 'Preempt' other active lower-priority service-chains by rerouting them towards alternative higher delay virtual service functions just to relieve the load on VNFs that might be optimal for the high-priority service-chain, and re-run the algorithm until a feasible solution is reached;

(b) If there are no feasible solutions, then start dropping packets of the lower priority service-chains to relief the loaded VNFs; and (c) Activate new VNFs to meet the high priority SFC's requirements. This step may be executed directly by the controller or may require the controller to send a request to the Orchestrator.

Figure 5:
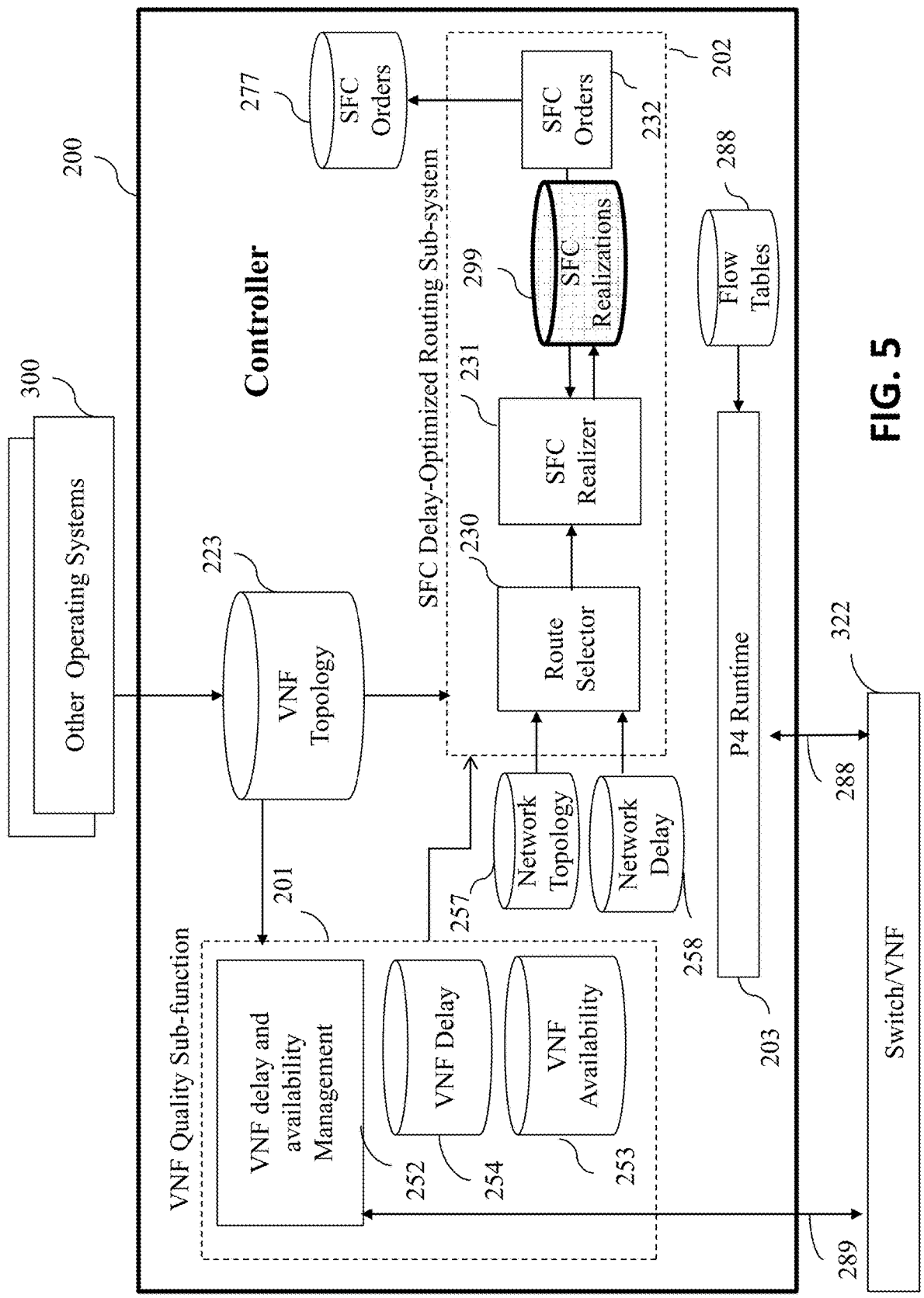
FIG. 5 depicts a block diagram of an embodiment of the system of invention.

FIG. 5 shows the block diagram of an embodiment of Controller 200 according to an aspect of this invention. Controller 200 has two new sub-functions: (a) VNF quality sub-function 201, and (b) SFC delay-optimized routing sub-function 202. VNF quality sub-function 201 has a major role of collecting the availability and delay information from all VNF instances in real-time from the data network. The collected information is stored in VNF Delay DB 254 and VNF Availability DB 253. The interface 289 that is between the VNF delay and availability manager 252 and switch 322 is used for the switches (network switches and vSwitches) to transmit delay information to the controller in real-time. The data in VNF topology 223, which contains the identifier, location, capacity, and other relevant information of each VNF in the network, is obtained from external systems/OSS/BSS 300. This information is fed into sub-function 201.

SFC delay-optimized routing sub-function 202 is where the feasible SFC Realizations are determined considering the feasible data plane routes and the cross mapping them to the functional components of the service-chain. Route Selector 230, which uses the network topology information from database 257 and network delay information from database 258, determines network routes for packet flows (whether it is an SFC and non-SFC). SFC Orders 277 contains service-chaining orders and their requirements (high priority etc.), which are entered into the system through SFC Orders 232. SFC Realizer 231 determines the highest quality (e.g., lowest delay) paths that traverse all virtual functions in the chain. The set of all SFC realizations is stored in DB 299. SFC Realizations feed the order fulfillment information into SFC Orders 232. Once the optimal route is selected, flow rules 288 are generated and sent to switches 322 by the controller using P4 Runtime.

Figure 6:
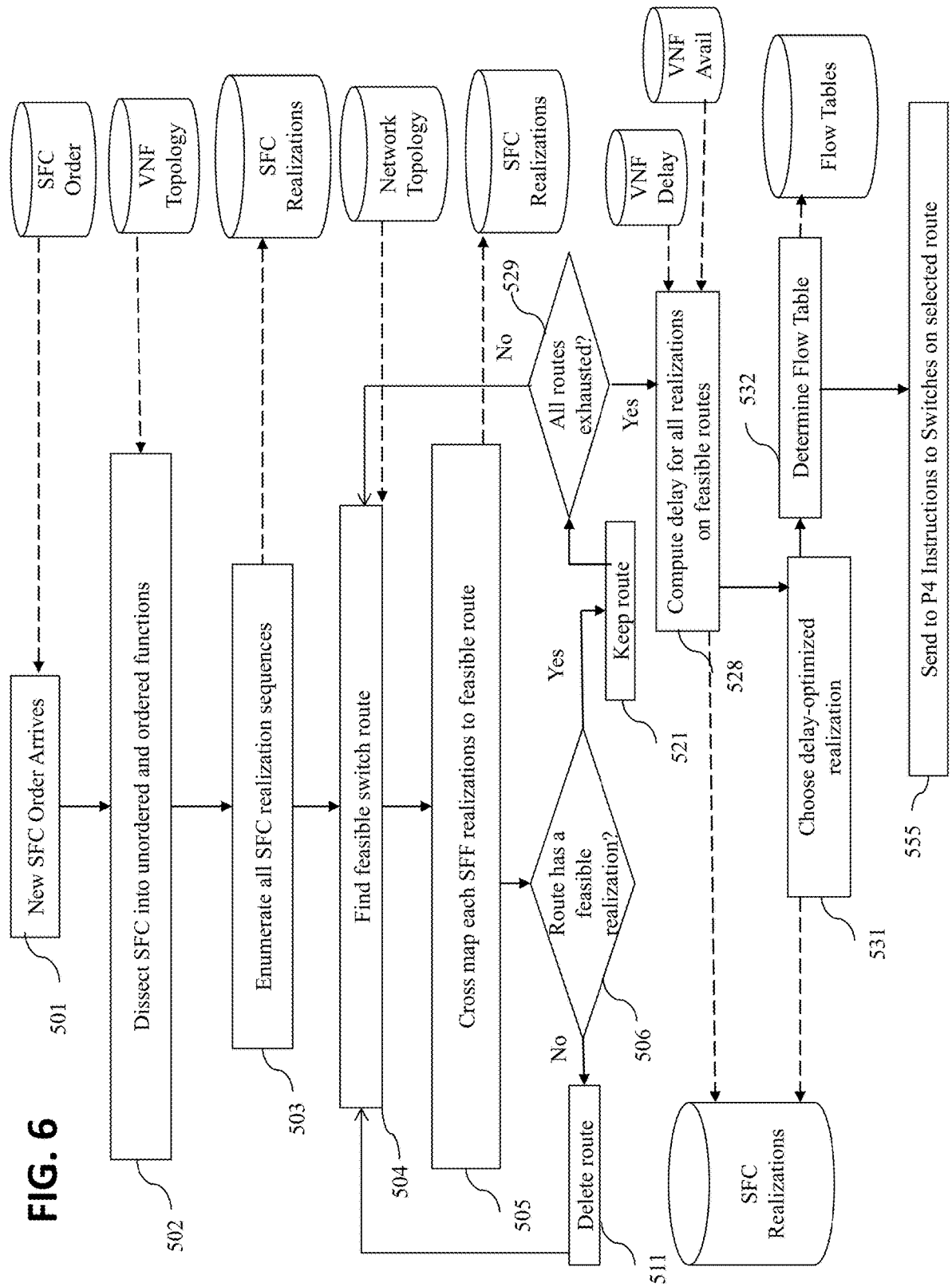
FIG. 6 depicts a simple flow chart illustrating delay-optimized routing steps for SFC.

A simple flow-chart illustrating the basic steps of the method of invention is shown in FIG. 6. At step 501, an order of a packet flow between a source and destination with an SFC is entered into SFC Orders DB 277. SFC Orders 232 dissects the order into unordered and ordered functions in step 502. If there are no unordered function components, then the service-chain is treated as ordered. All possible SFC realization sequences are determined in step 503. A first data path is determined at step 504 between the source and destination, and that route is cross-mapped into SFC Realizations to determine if it is indeed a feasible route at step 506. If the answer is no, the route is deleted from the list in step 511, and, if the answer is yes, the route is kept. This loop between steps 504 and 529 is repeated until all routes are exhausted. Once the list of all feasible routes is completed in SFC Realizations, the corresponding delays are computed in step 528 using VNF Delay and Availability DBs, and then stored into the SFC Realizations DB just as illustrated in FIG. 4.

Note that the VNF Availability DB plays a role in providing the information of whether a selected VNF is up or down. The VNF availability can be measured on the data plane using various methods. One method is determining the difference between the packet count going into and out of a VNF at the port (physical or virtual) attached to that VNF over a specified period of time (e.g., thousands of packets going in but none of them coming out). If that difference is higher than a threshold, then the VNF is deemed unavailable. The controller activates the availability testing using the VNF Delay and Availability Manager 252. The VNF Delay and Availability information is updated in real-time using interface 289.

The delay-optimized solution is chosen in step 531, associated flow rules are determined in step 532, and P4 instructions are sent to switches in step 555. Note that the method of FIG. 6 assumes simple steps of the third algorithmic embodiment to describe the role of each function, but many other algorithms are possible, and should be assumed covered by this invention.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system, method and article of manufacture has been shown in the above embodiments for effective path determination for delay-optimized service function chaining. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A controller in a software defined network (SDN) comprising a plurality of network switches interconnected with a plurality of transmission facilities, either the network switches or hardware platforms attached to the switches hosting a plurality of virtual network functions, the controller comprising a processor and storage storing computer readable program code, which when executed by the processor implements:
(a) a first application to receive one or more service function chain orders of packet flows, at least one of the orders comprising a service function chain;
(b) a second application to receive, in real-time, delay measurements from any of, or a combination of, the following: one of the virtual network functions and one of the network switches;
(c) a third application to determine a plurality of realizations of the service function chain orders of (a) in order to minimize a total delay, where the total delay is computed from one or more delays incurred due to a chain of one or more virtual network functions in the plurality of virtual network functions and due to one or more network switches in the plurality of network switches, the third application choosing an optimal realization within the plurality of realizations corresponding to a least delay;
(d) a fourth application to receive the optimal realization in (c) and to determine one or more flow rules for the one or more network switches in the plurality of network switches, and wherein the third application further determines an alternative route for an active lower priority service chain if a feasible solution for a higher priority service chain is not realizable to re-optimize the network and preempts the active lower priority service chain by rerouting them towards alternative higher delay virtual service functions.

2. The controller of claim 1, wherein the first application further receives a priority or QoS class for the service function chain.

3. The controller of claim 1, wherein the first application further dissects at least one of the service chain function orders into unordered and ordered virtual functions and enumerates possible service chain sequences.

4. The controller of claim 1, wherein the second application, in addition to the delay measurements, further receives an availability of one or more service functions in the SDN.

5. The controller of claim 1, wherein the third application uses an optimization algorithm to determine the optimal realization.

6. The controller of claim 1, wherein the third application determines service function availability by comparing incoming and outgoing packets on a port a given virtual network function attaches to.

7. A method as implemented in a controller in a software defined network (SDN) comprising a plurality of network switches interconnected with a plurality of transmission facilities, either the network switches or hardware platforms attached to the switches hosting a plurality of virtual network functions, the method comprising:
(a) receiving one or more service function chain orders of packet flows, at least one of the orders comprising a service function chain;
(b) receiving, in real-time, delay measurements from any of, or a combination of, the following: one of the virtual network functions and one of the network switches;
(c) determining a plurality of realizations of the service function chain orders of (a) in order to minimize a total delay, where the total delay is computed from one or more delays incurred due to a chain of one or more virtual network functions in the plurality of virtual network functions and due to one or more network switches in the plurality of network switches;
(d) choosing an optimal realization within the plurality of realizations corresponding to a least delay;
(e) determining one or more flow rules for the one or more network switches in the plurality of network switches, the determining based on the optimal realization in, and
(f) determining an alternative route for an active lower priority service chain if a feasible solution for a higher priority service chain is not realizable to re-optimize the network and preempts the active lower priority service chain by rerouting them towards alternative higher delay virtual service functions.

8. The method of claim 7 wherein, in step (a), the method further comprises receiving a priority or QoS class for the service function chain.

9. The method of claim 7 wherein, in step (a), the method further comprises dissecting at least one of the service chain function orders into unordered and ordered virtual functions and enumerating possible service chain sequences.

10. The method of claim 7 wherein, in step (b), in addition to the delay measurements, the method further comprises receiving an availability of one or more service functions in the SDN.

11. The method of claim 10 wherein, the availability is determined by comparing incoming and outgoing packets at a virtual network function port over a specified time period.

12. The method of claim 7, wherein an optimization algorithm is used to determine the optimal realization in (d).

13. The method of claim 7 wherein, in step (c), the method further comprises determining service function availability by comparing incoming and outgoing packets on a port a given virtual network function attaches to.

14. The method of claim 7, wherein when a feasible solution is not realizable for a higher priority service chain, the method further comprises determining an alternative route for an active lower priority service chain to re-optimize the SDN network, and repeating steps (b) and (c) and preempts the active lower priority service chain by rerouting them towards alternative higher delay virtual service functions.

15. The method of claim 14, wherein the method further comprises determining one or more virtual function resources to add in the SDN network and activating such virtual function resources.

16. An article of manufacture comprising non-transitory computer storage medium storing computer readable program code which, when executed by a processor implements a method as implemented in a method as implemented in a controller in a software defined network (SDN) comprising a plurality of network switches interconnected with a plurality of transmission facilities, either the network switches or hardware platforms attached to the switches hosting a plurality of virtual network functions, the computer storage medium comprising:

(a) computer readable program code receiving one or more service function chain orders of packet flows, at least one of the orders comprising a service function chain;

(b) computer readable program code receiving, in real-time, delay measurements from any of, or a combination of, the following: one of the virtual network functions and one of the network switches;

(c) computer readable program code determining a plurality of realizations of the service function chain orders of (a) in order to minimize a total delay, where the total delay is computed from one or more delays incurred due to a chain of one or more virtual network functions in the plurality of virtual network functions and due to one or more network switches in the plurality of network switches;

(d) computer readable program code choosing an optimal realization within the plurality of realizations corresponding to a least delay;

(e) computer readable program code determining one or more flow rules for the one or more network switches in the plurality of network switches, the determining based on the optimal realization in (d), and (f) computer readable program code determining an alternative route for an active lower priority service chain if a feasible solution for a higher priority service chain is not realizable to re-optimize the network and preempts the active lower priority service chain by rerouting them towards alternative higher delay virtual service functions.

17. The article of manufacture of claim 16 wherein, the computer storage medium further comprises computer readable program code in (a) receiving a priority or QoS class for the service function chain.

18. The article of manufacture of claim 16 wherein, the computer storage medium further comprises computer readable program code in (a), dissecting at least one of the service chain function orders into unordered and ordered virtual functions and enumerating possible service chain sequences.

* * * * *